United States Patent
Khmelnitsky (10) Patent No.: US 9,104,614 B2
(45) Date of Patent: Aug. 11, 2015

(54) HANDLING UNCLEAN SHUTDOWNS FOR A SYSTEM HAVING NON-VOLATILE MEMORY

(75) Inventor: Vadim Khmelnitsky, Foster City, CA (US)

(73) Assignee: APPLE INC., Cupertino, CA (US)

( * ) Notice: Subject to any disclaimer, the term of this patent is extended or adjusted under 35 U.S.C. 154(b) by 243 days.

(21) Appl. No.: 13/234,934

(22) Filed: Sep. 16, 2011

(65) Prior Publication Data

US 2013/0073897 A1    Mar. 21, 2013

(51) Int. Cl.
*G06F 11/00* (2006.01)
*G06F 11/14* (2006.01)
*G06F 12/02* (2006.01)

(52) U.S. Cl.
CPC ........ *G06F 11/1417* (2013.01); *G06F 11/1435* (2013.01); *G06F 11/1441* (2013.01); *G06F 12/0246* (2013.01); *G06F 2201/835* (2013.01); *G06F 2212/7201* (2013.01)

(58) Field of Classification Search
CPC ............ G06F 11/1435; G06F 11/1417; G06F 11/2284; G06F 11/22
USPC ....................................... 714/15, 36
See application file for complete search history.

(56) References Cited

U.S. PATENT DOCUMENTS

| | | | |
|---|---|---|---|
| 6,397,351 B1 | 5/2002 | Miller et al. | |
| 7,051,050 B2 | 5/2006 | Chen et al. | |
| 7,237,080 B2 | 6/2007 | Green et al. | |
| 2003/0070110 A1 | 4/2003 | Aija et al. | |
| 2004/0111443 A1* | 6/2004 | Wong et al. | 707/202 |
| 2004/0267835 A1 | 12/2004 | Zwilling et al. | |
| 2005/0131853 A1* | 6/2005 | Sampath et al. | 707/1 |
| 2007/0300037 A1* | 12/2007 | Rogers et al. | 711/202 |
| 2008/0162795 A1* | 7/2008 | Hsieh et al. | 711/103 |
| 2009/0089610 A1 | 4/2009 | Rogers et al. | |
| 2010/0250837 A1 | 9/2010 | Schmidberger et al. | |
| 2011/0022780 A1 | 1/2011 | Wakrat et al. | |
| 2011/0072199 A1 | 3/2011 | Reiter et al. | |
| 2012/0239860 A1* | 9/2012 | Atkisson et al. | 711/103 |

FOREIGN PATENT DOCUMENTS

| | | |
|---|---|---|
| CN | 101169751 | 4/2008 |
| CN | 101930404 | 12/2010 |
| TW | 200530813 | 9/2005 |
| WO | 2011/021174 | 2/2011 |

OTHER PUBLICATIONS

Post et al., U.S. Appl. No. 12/729,556, filed Mar. 23, 2010.
Wakrat et al., U.S. Appl. No. 13/012,005, filed Jan. 24, 2011.
Sivathanu et al. "Ensuring Data Integrity in Storage: Techniques and Applications." StorageSS'05, Nov. 11, 2005, 11 pages, retrieved online on Oct. 26, 2012 at http://www.fsl.cs.sunysb.edu/docs/integrity-storagess05/integrity.pdf.

* cited by examiner

*Primary Examiner* — Philip Guyton
(74) *Attorney, Agent, or Firm* — Van Court & Aldridge LLP (57) ABSTRACT

Systems and methods are disclosed for handling unclean shutdowns for a system having non-volatile memory ("NVM"). In some embodiments, the system can leverage from information obtained from index pages in order to efficiently reconstruct logical-to-physical mappings after an unclean shutdown event. In other embodiments, the system can reconstruct logical-to-physical mappings by leveraging from context information stored in a NVM. In further embodiments, context information can be used in conjunction with index pages to reconstruct logical-to-physical mappings after an unclean shutdown.

10 Claims, 7 Drawing Sheets

HANDLING UNCLEAN SHUTDOWNS FOR A SYSTEM HAVING NON-VOLATILE MEMORY

BACKGROUND OF THE DISCLOSURE

NAND flash memory, as well as other types of non-volatile memories ("NVMs"), are commonly used for mass storage. For example, consumer electronics such as portable media players often include flash memory to store music, videos, and other media.

A NVM can include multiple index pages to provide mappings between logical addresses and physical addresses. In some cases, mapping information corresponding to the most recently written user data is stored in the volatile memory of the device in order to provide faster readout. Periodically, this mapping information can be flushed out from the volatile memory to the index pages of the NVM to provide for longer-term storage of the information.

When an electronic device having a NVM shuts down cleanly, information stored in the index pages can be used directly to reconstruct the logical-to-physical mapping in volatile memory. However, when an electronic device shuts down uncleanly, at least some of the index pages may be outdated because the device may not have fully flushed out the most recent mapping information to the index pages. Consequently, the device may need to scan the entire NVM in order to reconstruct the logical-to-physical mapping in volatile memory. This process may be costly from a time perspective.

SUMMARY OF THE DISCLOSURE

Systems and methods are disclosed for handling unclean shutdowns for a system having non-volatile memory. In some embodiments, the system can leverage information obtained from index pages in order to more efficiently reconstruct logical-to-physical mappings after an unclean shutdown. As used herein, an "index page" can be a page of the NVM that stores mappings between logical addresses used by a file system and physical addresses of data pages (e.g., pages of the NVM that store user data).

In other embodiments, the system can reconstruct logical-to-physical mappings by leveraging from context information that is also stored in the NVM. As used herein, "context information" can refer to information associated with the state of the entire NVM at a particular point in time. In further embodiments, context information can be used in conjunction with index pages to reconstruct logical-to-physical mappings after an unclean shutdown.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Systems and methods for handling unclean shutdowns for a system having non-volatile memory are provided. In particular, a NVM interface of a system can leverage information obtained from index pages in order to more efficiently reconstruct logical-to-physical mappings after an unclean shutdown. As used herein, "index pages" can be pages of the NVM for storing mappings between logical addresses used by a file system and physical addresses of data pages (e.g., pages of the NVM that store user data).

For example, the NVM interface can perform the reconstruction by scanning the index pages to obtain the ages of the index pages. The NVM interface can then compare the ages of the index pages with the ages of corresponding data pages, and determine whether a particular index page is younger (e.g., fresher) or older than the corresponding data pages.

If the NVM interface determines that the age of an index page is older than the ages of corresponding data pages, the NVM interface can determine that the index page is not reliable (e.g., the index page has not been updated since the data pages were updated). Consequently, the NVM interface can scan younger data blocks to reconstruct the logical-to-physical mappings.

In contrast, if the NVM interface instead determines that the age of an index page is not older than the ages of corresponding data pages, the NVM interface can determine that the index page is reliable (e.g., the index page was updated after or at the same time as the data pages). Consequently, the NVM interface can use the mappings stored in the index page to reconstruct the mappings in volatile memory.

In some embodiments, the system can reconstruct logical-to-physical mappings by leveraging from context information stored in a NVM. As used herein, "context information" can refer to information associated with the state of the entire NVM at a particular point in time. In further embodiments, context information can be used in conjunction with index pages to reconstruct logical-to-physical mappings after an unclean shutdown.

Figure 1:
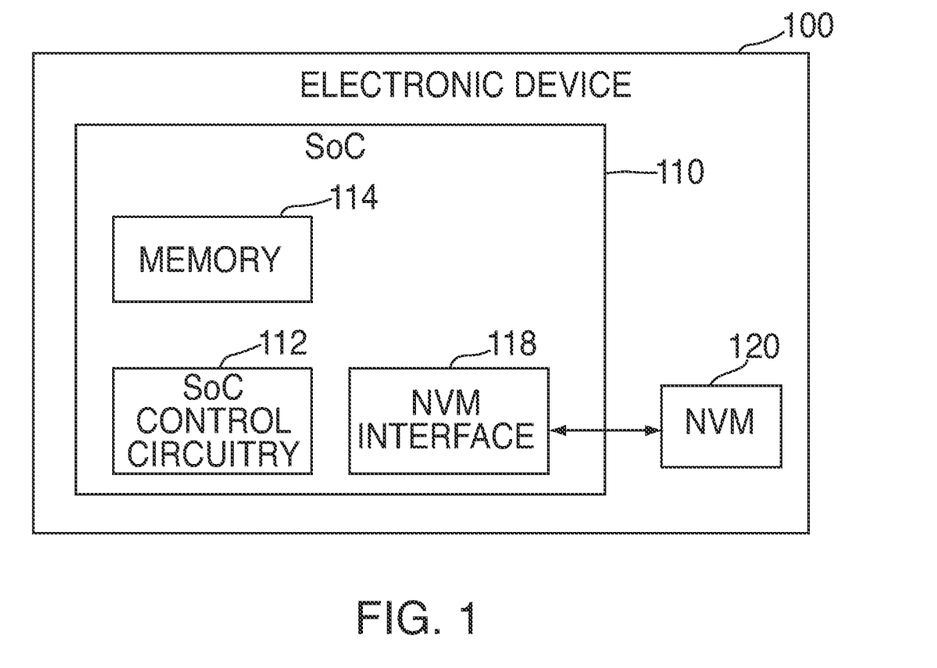
FIGS. 1 and 2 are block diagrams of electronic devices configured in accordance with various embodiments of the invention.

FIG. 1 illustrates a block diagram of electronic device 100. In some embodiments, electronic device 100 can be or can include a portable media player, a cellular telephone, a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof.

NVM 120 can be organized into "blocks", which can the smallest erasable unit, and further organized into "pages", which can be the smallest unit that can be programmed or read. In some embodiments, NVM 120 can include multiple integrated circuits, where each integrated circuit may have multiple blocks. Memory locations (e.g., blocks or pages of blocks) from corresponding integrated circuits may form "super blocks". Each memory location (e.g., page or block) of NVM 120 can be referenced using a physical address (e.g., a physical page address or physical block address).

One or more pages of NVM 120 can be data pages, which can be used to store data associated with the general operations of components of SoC 110 or device 100. In addition, one or more pages of NVM 120 can be used to store an index table. In embodiments where logical sectors are mapped directly to physical pages, logical-to-physical mappings can be stored in the index table. As used herein, a "logical-to-physical mapping" can be a mapping between one or more logical addresses (e.g., logical sectors) and physical page addresses of data pages. For example, the index table can hold the physical addresses of the data pages of NVM 120.

In some cases, an index table can include multiple index pages, where each index page can map logical addresses to one or more physical addresses of data pages. Index table and index pages will be described in more detail in connection with FIG. 3.

System-on-a-chip 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write commands to NVM interface 118 to obtain data from or store data in NVM 120. For clarity, data that SoC control circuitry 112 may request for storage or retrieval may be referred to as "user data," even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM, cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

Memory 114 can include a lookup table and/or an index table cache. The lookup table can hold the location (e.g., physical address) of an index table stored in NVM 120. The index table cache can hold the physical addresses of recently written logical addresses (e.g., logical sectors) in order to provide faster readout. On a periodic basis, information stored in the index table cache can be flushed out from the index cable cache to the index pages of NVM 120.

In some embodiments, the size of the index table cache can be a small fraction of the size of the index pages. By storing the majority of mapping information in the index pages rather than the index table cache, more space can be freed up in memory 114 for other purposes. Lookup table and index table cache will be described in more detail in connection with FIG. 3.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write requests from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, SoC control circuitry 112 may execute a software-based memory driver for NVM interface 118.

In some embodiments, electronic device 100 can include a target device, such as a flash memory drive or Secure Digital ("SD") card, that includes NVM 120 and some or all portions of NVM interface 118 (e.g., a translation layer, discussed below). In these embodiments, SoC 110 or SoC control circuitry 112 may act as the host controller for the target device. For example, as the host controller, SoC 110 can issue read and write requests to the target device.

Figure 2:
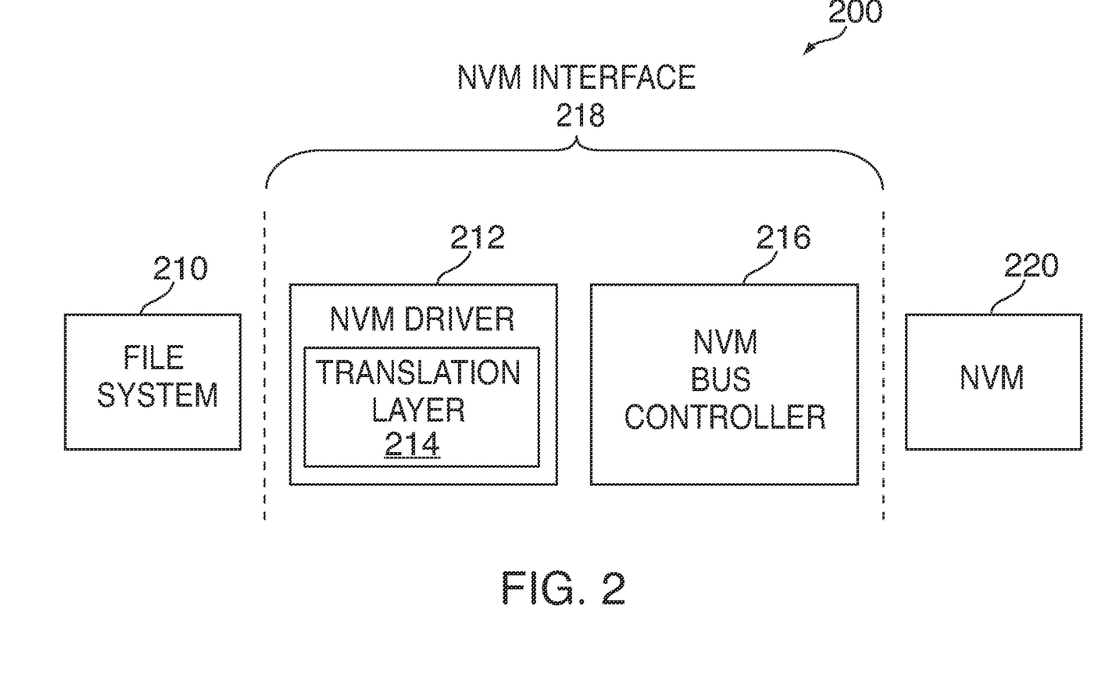

FIG. 2 illustrates a block diagram of electronic device 200, which may illustrate in greater detail some of the firmware, software, and/or hardware components of electronic device 100 (FIG. 1) in accordance with various embodiments. Electronic device 200 may have any of the features and functionalities described above in connection with FIG. 1, and vice versa. As shown, dashed lines demarcate the layers. It is understood that the depiction of which components fall within the demarcation lines are merely illustrative and that one or more components can be affiliated with a different layer.

Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system, such as a File Allocation Table ("FAT") file system or a Hierarchical File System Plus ("HFS+"), and may be part of the operating system of electronic device 200 (e.g., part of SoC control circuitry 112 of FIG. 1). In some embodiments, file system 210 may include a flash file system, which provides a logical-to-physical mapping of pages. In these embodiments, file system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read commands to NVM driver 212 when the application or operating system requests that information be read from or stored in NVM 220. Along with each read or write command, file system 210 can provide a logical address to indicate where the user data should be read from or written to, such as a logical page address or a logical block address ("LBA") with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write command, translation layer 214 can map the provided logical address to a free, erased physical location on NVM 220. On a read command, translation layer 214 can use the provided logical address to determine the physical address at which the requested data is stored. Because each NVM may have a different layout depending on the size or vendor of the NVM, this mapping operation may be memory and/or vendor-specific. Translation layer 214 can perform any other suitable functions in addition to logical-to-physical address mapping. For example, translation layer 214 can perform any of the other functions that may be typical of flash translation layers, such as garbage collection and wear leveling.

NVM driver 212 may interface with NVM bus controller 216 to complete NVM access commands (e.g., program, read, and erase commands). Bus controller 216 may act as the hardware interface to NVM 220, and can communicate with NVM 220 using the bus protocol, data rate, and other specifications of NVM 220.

NVM interface 218 may manage NVM 220 based on memory management data, sometimes referred to herein as "metadata". The metadata may be generated by NVM driver 212 or may be generated by a module operating under the control of NVM driver 212. For example, metadata can include any information used for managing the mapping between logical and physical addresses, bad block management, wear leveling, error-correcting code ("ECC") data used for detecting or correcting data errors, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one or more memory locations of NVM 220. NVM interface 218 may also store other types of metadata about the user data in the same memory location.

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association. This way, even if an index table in NVM 220 maintaining the physical-to-logical mapping becomes outdated, NVM interface 218 may still determine the proper mapping at power-up or reboot of electronic device 200, for example.

Figure 3:
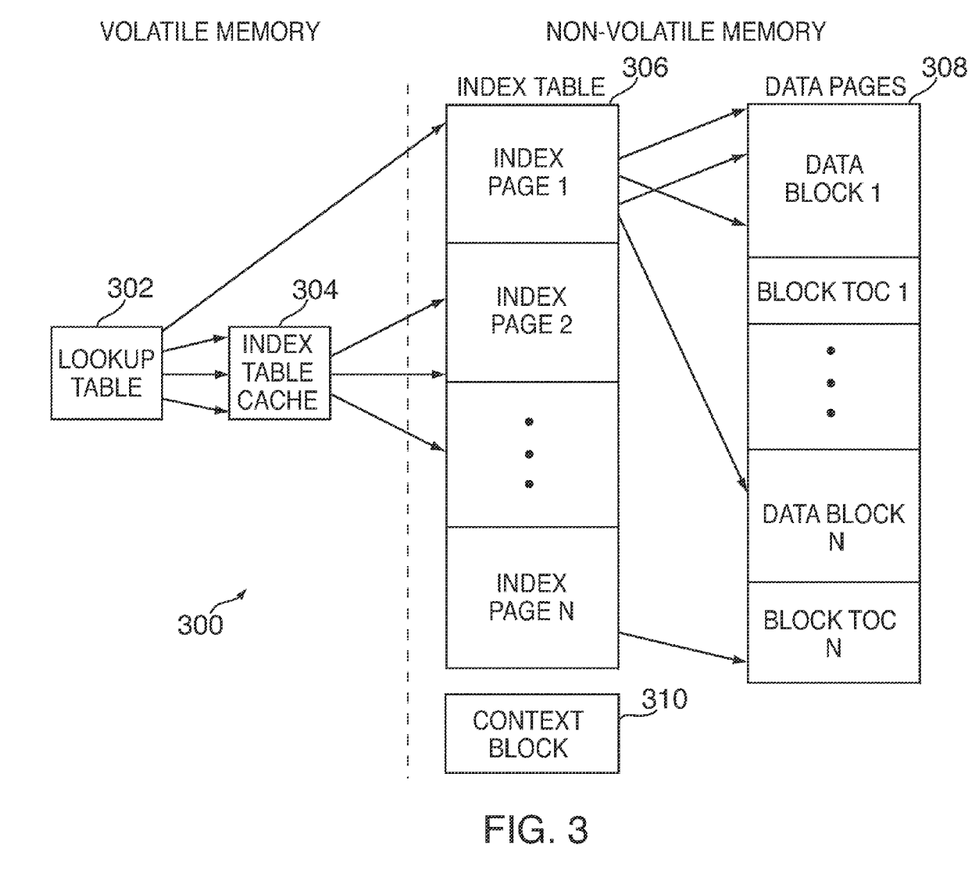
FIG. 3 is an illustrative block diagram of a memory mapping architecture in accordance with various embodiments of the invention.

Referring now to FIG. 3, a block diagram illustrating an example memory mapping architecture 300 for mapping logical addresses to physical pages is shown. Architecture 300 is divided into volatile memory (shown left of the dashed line) and non-volatile memory (shown right of the dashed line). Lookup table 302 and index table cache 304 are stored in volatile memory (e.g., memory 114 of FIG. 1), whereas index table 306 and data pages 308 are stored in non-volatile memory (e.g., NVM 120 of FIG. 1 or NVM 220 of FIG. 2). As shown in FIG. 3, data pages 308 are included in data blocks 1-N.

Index table 306 can include index pages 1-N. Each of index pages 1-N of index table 306 can store one or more logical-to-physical mappings. For example, as shown in FIG. 3, index page 1 of index table 306 can map logical addresses to one or more data pages of data block 1 and data block N.

Lookup table 302 can hold the location (e.g., physical addresses) of index table 306. For example, lookup table 302 can hold the logical-to-physical mappings of index pages 1-N that form part of index table 306. In addition, lookup table 302 can also store the memory location(s) of index table cache 304.

Index table cache 304 can hold the physical addresses of recently written or accessed logical addresses. That is, cache 304 can hold logical-to-physical mappings for data pages 308 currently being programmed or have recently been programmed. On a periodic basis, information stored in cache 304 can be flushed out to index pages 1-N of index table 306. As a result, cache 304 can sometimes provide a redundant copy of mapping that may also be stored in index table 306.

When an electronic device shuts down cleanly (e.g., all of the information stored in cache 304 has been flushed out to index table 306), the device can assume that the logical-to-physical mappings stored in index pages 1-N are valid. Consequently, after the device is powered on or rebooted, the device can directly use the mappings stored in index pages 1-N to reconstruct the mappings in volatile memory. For example, a NVM interface (e.g., NVM interface 118 of FIG. 1 or NVM interface 218 of FIG. 2) can copy the logical-to-physical mappings of index pages 1-N to cache 304. Because index pages 1-N may only occupy a fraction of the size of data pages 308, this process can be more efficient as compared to obtaining logical-to-physical mappings by scanning the entire NVM.

In contrast, when an electronic device shuts down uncleanly (e.g., at least some of the information stored in cache 304 has not been flushed out to index table 306), the device may not be able to rely on the information stored in index table 306. In particular, index table 306 may not capture the most recently written or erased user data.

Conventionally, once the device reboots, it is assumed that the logical-to-physical mappings stored in index table 306 are invalid. Thus, the device may proceed to scan the data blocks of the NVM in order to reconstruct logical-to-physical mappings in cache 304. For example, the device may scan a data block by reading a block table-of-contents ("TOC") that is associated with the data block. For instance, in the example shown in FIG. 3, block TOC 1 may be associated with data block 1, block TOC N may be associated with data block N, and so forth. Each block TOC can be stored in the corresponding data block, and can include information that maps data pages of the data block to corresponding logical addresses. In conventional systems, the block TOC may include only the logical address (e.g., the LBA or the logical page number) for each page that is programmed. In other embodiments, the block TOC can also include the relative age of updates made to a page (e.g., when the page has been updated relative to other data and/or index pages). In such a configuration, the block TOC can include a logical address-age pair for each data and/or index page that is programmed.

As discussed previously, the process of scanning each data block of the NVM can be time-consuming and inefficient. Accordingly, instead of automatically scanning all of the data blocks of the NVM, the device can leverage information obtained from other sources (e.g., index pages and/or context information) in order to more efficiently reconstruct the logical-to-physical mappings after an unclean shutdown. Turning now to FIGS. 4-7, flowcharts of illustrative processes are shown in accordance with various embodiments of the invention. These processes may be executed by one or more components of a system (e.g., electronic device 100 of FIG. 1 or electronic device 200 of FIG. 2). For example, at least some of the steps in the processes of FIGS. 4-7 may be performed by a NVM interface (e.g., NVM interface 118 of FIG. 1 or NVM interface 218 of FIG. 2). In addition, persons skilled in the art will appreciate that at least some of the steps may be performed by control circuitry (e.g., SoC control circuitry 112 of FIG. 1).

Figure 4:
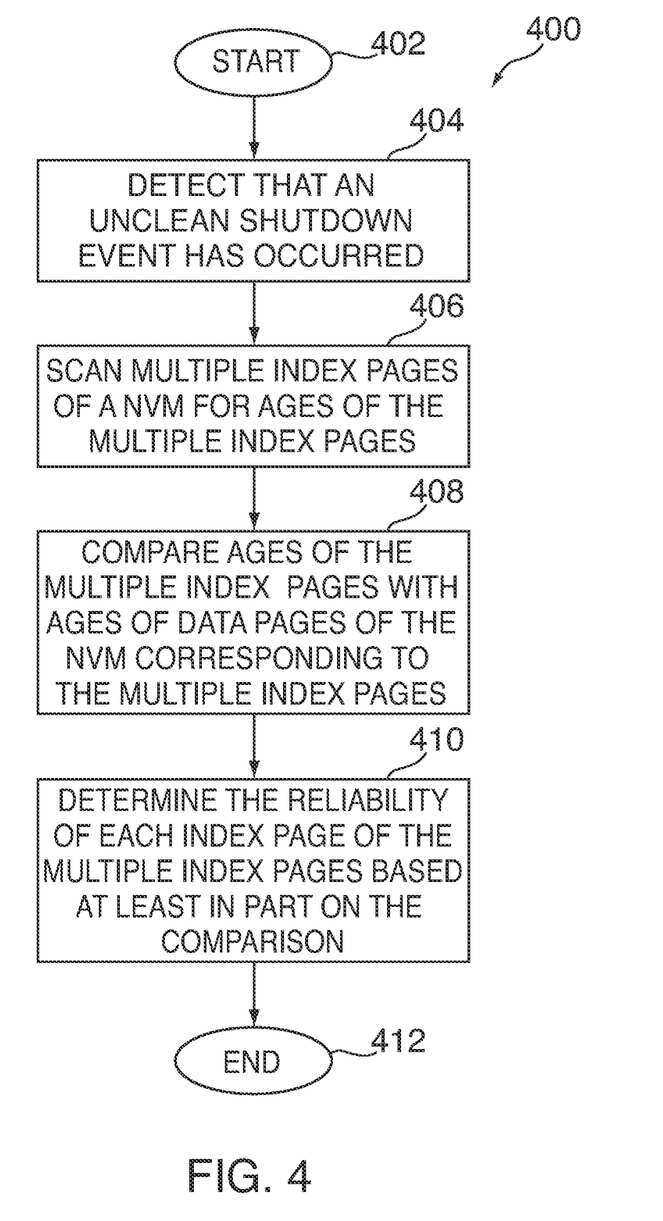
FIG. 4 is a flowchart of an illustrative process for handling an unclean shutdown event in accordance with various embodiments of the invention.

Turning first to FIG. 4, process 400 is shown for handling an unclean shutdown event. Process 400 may begin at step 402, and, at step 404, the NVM interface can determine that an unclean shutdown event has occurred.

At step 406, the NVM interface can scan multiple index pages (e.g., index pages 1-N of FIG. 3) of a NVM (e.g., NVM 120 of FIG. 1 or NVM 220 of FIG. 2) for the ages of the index pages. The age of an index page may be an indication of the reliability of that index page.

Continuing to step 408, the NVM interface can compare the ages of the index pages with ages of data pages of the NVM corresponding to the index pages. Based on this comparison, the NVM interface can determine whether a particular index page is younger (e.g., fresher) or older than the corresponding data pages.

Persons skilled in the art will appreciate that any suitable parameter(s) (e.g., one or more parameters stored as metadata) can be used for comparing the relative ages of index pages and corresponding data pages. For example, a counter can be used that may be inversely related to an age of a page (e.g., an older page may be associated with a smaller counter, and a younger page may be associated with a larger counter).

After comparing the ages of the index pages with the ages of corresponding data pages, process 400 may move to step 410. At step 410, the NVM interface can determine the reliability of each index page based at least in part on the comparison.

In particular, if the NVM interface determines that the age of an index page is older than the ages of corresponding data pages, the NVM interface can determine that the index page is unreliable and therefore invalid (e.g., the index page has not been updated since corresponding data pages were updated). Consequently, the NVM interface can scan younger data blocks to reconstruct the logical-to-physical mappings corresponding to logical addresses of the index page.

In contrast, if the NVM interface instead determines that the age of an index page is not older than the ages of corresponding data pages (e.g., age of the index page is younger than or the same as the ages of corresponding data pages), the NVM interface can determine that the index page is reliable and therefore valid (e.g., the index page was updated after or at the same time as corresponding data pages). Consequently, the logical-to-physical mappings stored in the index page can be considered valid, and the NVM interface can use the mappings of the index page to reconstruct the mappings in volatile memory. Process 400 may then end at step 412.

By using such an approach, the NVM interface can avoid scanning every data block of the NVM, and instead directly use a subset of index pages (e.g., valid index pages) to reconstruct logical-to-physical mappings in volatile memory. Furthermore, because invalid index pages may constitute a small portion of the overall number of index pages, the NVM interface may only need to scan a small subset of data blocks corresponding to logical addresses of the invalid index pages. Accordingly, this approach can significantly decrease the amount of time required for reconstructing logical-to-physical mappings after an unclean shutdown event.

Figure 5:
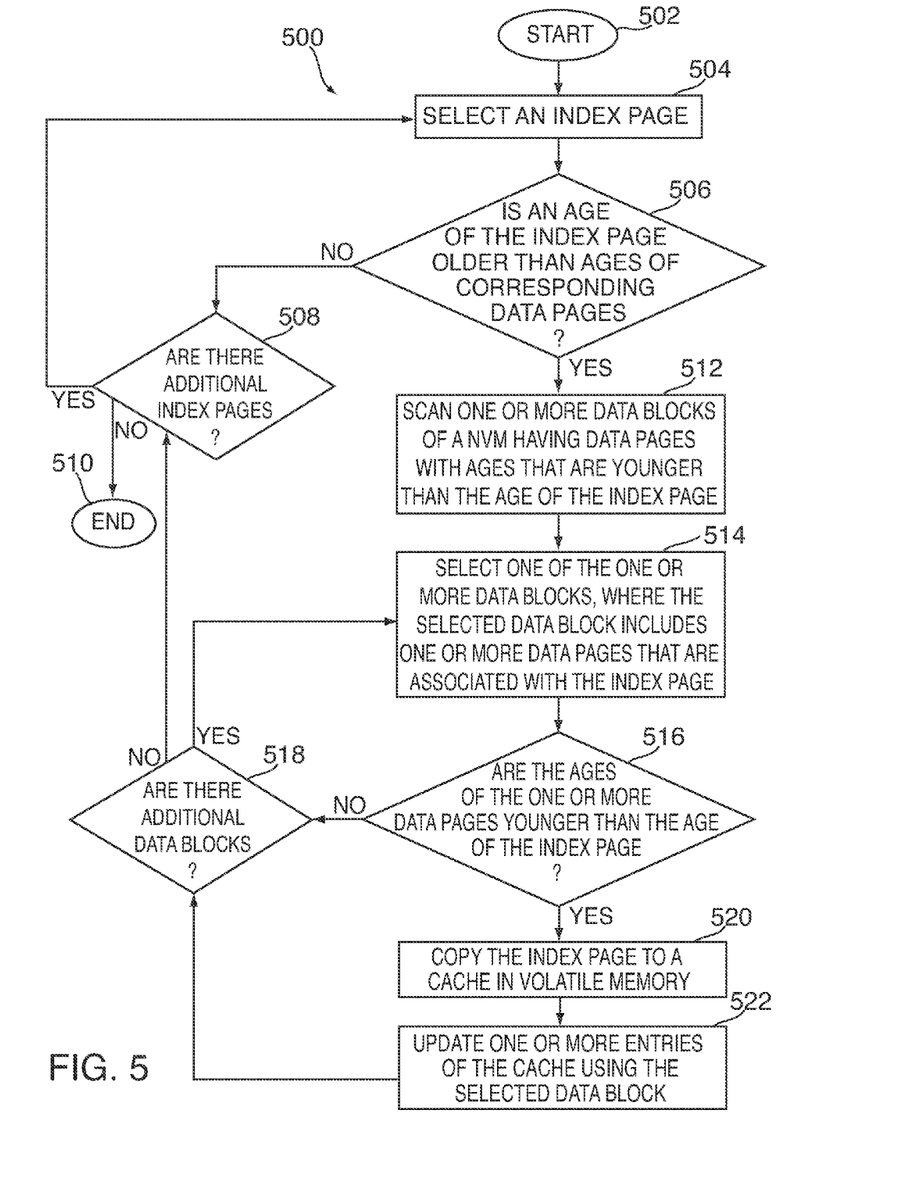
FIG. 5 is a flowchart of an illustrative process for comparing the age of an index page with ages of data pages in accordance with various embodiments of the invention.

Turning now to FIG. 5, process 500 is shown for comparing the age of an index page with ages of data pages of a NVM (e.g., NVM 120 of FIG. 1 or NVM 220 of FIG. 2). In some embodiments, process 500 may represent a more detailed view of the comparing step 408 and the determining step 410 of process 400 (FIG. 4).

Process 500 may begin at step 502, and, at step 504, the NVM interface can select an index page stored in the NVM. For example, the NVM interface can select an index page from index table 306 (FIG. 3).

Then, at step 506, the NVM interface can determine whether an age of the index page is older than the ages of corresponding data pages. For example, the NVM interface can determine whether a counter of the index page is larger than the counters of corresponding data pages, and thereby determine whether the index page is valid. If the NVM interface determines that the age of an index page is not older than the ages of corresponding data pages (e.g., a counter of the index page is the same as or larger than the counters of corresponding data pages), process 500 may move to step 508. That is, the NVM interface has determined that the index page is a valid index page.

At step 508, the NVM interface can determine whether there are additional index pages that have not yet been selected. If, at step 508, the NVM interface determines that there are no additional index pages, process 500 may end at step 510. If, at step 508, the NVM interface instead determines that there are additional index pages, process 500 may return to step 504, where the NVM interface can select another index page.

Referring back to step 506, if the NVM interface instead determines that the age of the index page is older than the ages of corresponding data pages (e.g., a counter of the index page is smaller than the counters of corresponding data pages), process 500 may move to step 512. That is, the NVM interface has determined that the index page is an invalid index page.

At step 512, the NVM interface can scan one or more data blocks of the NVM having data pages with ages that are younger than the age of the index page. Process 500 may then move to step 514.

At step 514, the NVM interface can select one of the one or more data blocks, where the selected data block includes one or more data pages that are associated with the index page (e.g., the index page may store logical-to-physical mappings corresponding to the one or more data pages of the selected data block).

Then, at step 516, the NVM interface can determine whether the ages of the one or more data pages are younger than the age of the index page. If, at step 516, the NVM interface determines that the ages of the one or more data pages are not younger than the age of the index page, process 500 may move to step 518.

At step 518, the NVM interface can determine whether there are additional data blocks in the one or more data blocks. If, at step 518, the NVM interface determines that there are additional data blocks, process 500 may move to step 514. At step 514, the NVM interface can select another data block having one or more data pages that are associated with the index page. If, at step 518, the NVM interface determines that there are no additional data blocks, process 500 may move to step 508, where the NVM interface can determine whether there are additional index pages.

Referring back to step 516, if the NVM interface instead determines that the ages of the one or more data pages are younger than the age of the index page, process 500 may move to step 520. At step 520, the NVM interface can copy the index page to an index table cache (e.g., index table cache 304 of FIG. 3) in volatile memory (e.g., memory 114 of FIG. 1).

At step 522, the NVM interface can update one or more entries of the cache using the selected data block. For example, using the selected data block, the NVM interface can reconstruct logical-to-physical mappings corresponding to one or more logical addresses of the index page.

In some embodiments, the NVM interface can reconstruct the logical-to-physical mappings by reading a block TOC of the selected data block (e.g., block TOC 1 of data block 1 or block TOC N of data block N of FIG. 3). For example, if the block TOC includes the relative age of page updates in addition to logical-to-physical mappings, the NVM interface can obtain updated logical-to-physical mappings by referring only to the block TOC.

In other embodiments, the NVM interface can reconstruct the logical-to-physical mappings by scanning metadata stored in the selected data block. For example, if the block TOC includes only the logical address of a programmed page, the NVM interface can determine the age of a page by scanning the metadata and obtain updated logical-to-physical mappings. After updating one or more entries of the index page, process 500 may move to step 522. In some embodiments, the NVM interface may update an index table (e.g., index table 306 of FIG. 3) with the reconstructed logical-to-physical mappings.

Process 500 may then move to step 518, where the NVM interface can determine whether there are additional data blocks.

Figure 6:
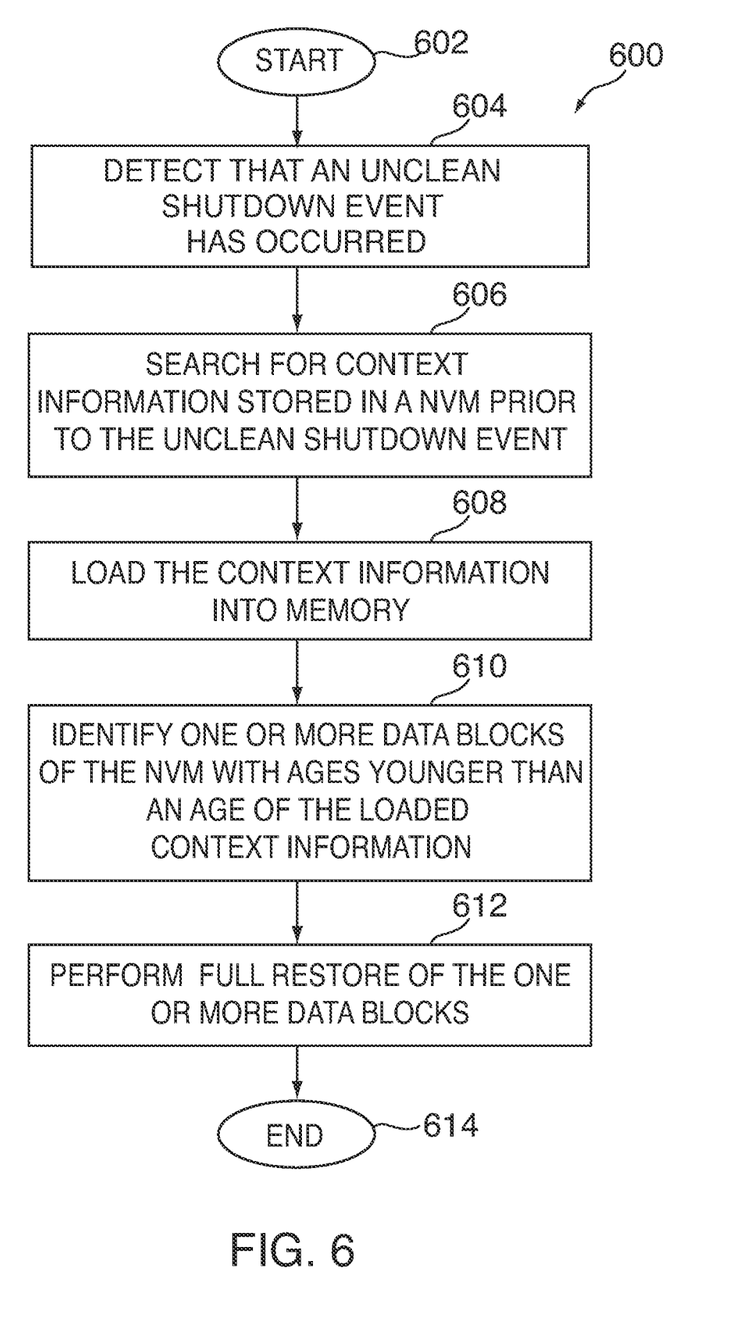
FIG. 6 is a flowchart of another illustrative process for handling an unclean shutdown event in accordance with various embodiments of the invention.

Referring now to FIG. 6, a flowchart of illustrative process 600 is shown for handling an unclean shutdown event using context information. In particular, a NVM interface can reconstruct logical-to-physical mappings by leveraging from context information stored in a NVM (e.g., NVM 120 of FIG. 1 or NVM 220 of FIG. 2). As used herein, "context information" can refer to information associated with the state of the entire NVM at a particular point in time. For example, context information can include logical-to-physical mappings for all of the data blocks of the NVM at a particular time.

In some embodiments, context information can be stored on one or more designated blocks of the NVM. For example, referring back to FIG. 3, context block 310 may be a block of the NVM that is used for storing context information.

Referring back to FIG. 6, process 600 may begin at step 602, and, at step 604, the NVM interface can detect that an unclean shutdown event has occurred. Then, at step 606, the NVM interface can search for context information stored in a NVM (e.g., in context block 310 of FIG. 3) prior to the unclean shutdown event. That is, the NVM interface can obtain the latest copy of context information that was saved in the NVM before an unclean shutdown event occurred. After searching for the context information, process 600 may move to step 608.

At step 608, the NVM interface can load the context information (e.g., the latest copy of the context information) into volatile memory (e.g., memory 114 of FIG. 1). For example, the NVM interface can load the context information into a cache (e.g., index table cache 304 of FIG. 3) and/or a lookup table (e.g., lookup table 302 of FIG. 3) of volatile memory.

Then, at step 610, the NVM interface can identify one or more data blocks of the NVM with ages that are younger than an age of the loaded context information (e.g., counters of the one or more data blocks that are larger than a counter of the context block where the context information is being stored). In particular, these data blocks may include updated logical-to-physical mappings that have not been captured by the context information. Process 600 may then proceed to step 612.

At step 612, the NVM interface can perform full restore of the one or more data blocks. For example, the NVM interface can scan the one or more data blocks (e.g., read one or more block TOCs and/or metadata of the data blocks) to obtain logical-to-physical mappings. If context information has been saved recently, the time for reconstructing logical-to-physical mappings is reduced because a full restore will only have to be performed on a small subset of data blocks.

Process 600 may then end at step 614. A more detailed description of the full restore process can be found in Wakrat et al., U.S. patent application Ser. No. 12/509,071, filed Jul. 24, 2009, entitled "Restore Index Page," which is hereby incorporated by reference in its entirety.

Figure 7:
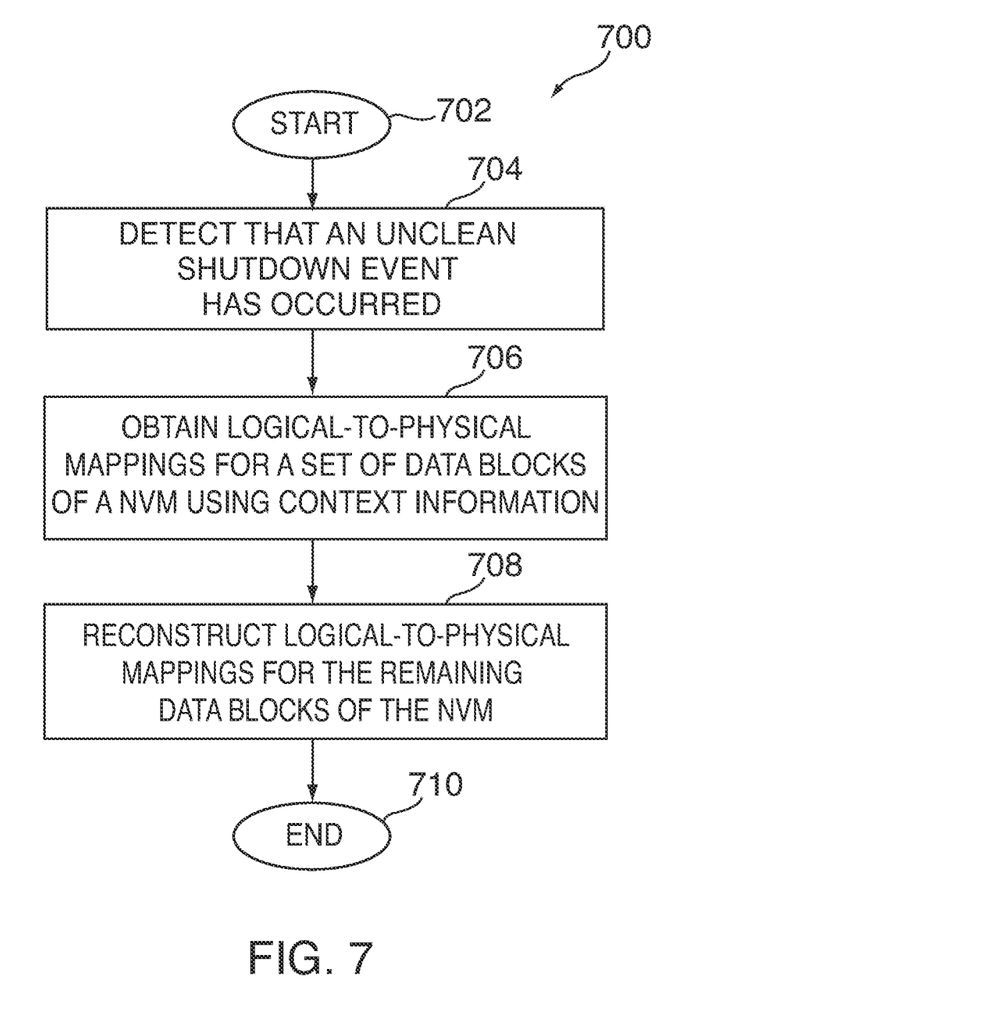
FIG. 7 is a flowchart of yet another illustrative process for handling an unclean shutdown event in accordance with various embodiments of the invention.

Referring now to FIG. 7, a flowchart of illustrative process 700 is shown for handling an unclean shutdown event using a hybrid approach. In particular, a NVM interface can reconstruct logical-to-physical mappings by leveraging from both context information and index pages.

Process 700 may begin at step 702, and, at step 704, the NVM interface can detect that an unclean shutdown event has occurred. Then, at step 706, the NVM interface can obtain logical-to-physical mappings for a set of data blocks of a NVM using context information. For example, the set of data blocks can be those data blocks that have not been updated since the context information was last saved.

Continuing to step 708, the NVM interface can reconstruct logical-to-physical mappings for the remaining data blocks of the NVM. For example, the NVM interface can reconstruct the logical-to-physical mappings using one or more index pages. The remaining data blocks can include those data blocks that have not been captured by the context information (e.g., data blocks that have been updated since the context information was last saved).

To reconstruct the logical-to-physical mappings for the remaining data blocks, the NVM interface can use a process similar to processes 400 (FIG. 4) and 500 (FIG. 5). For example, the one or more index pages can store a mapping between physical addresses of the remaining data blocks and corresponding logical addresses. In particular, the NVM interface can determine whether the ages of the one or more index pages are older than the ages of corresponding data pages.

If the NVM interface determines that the ages of the one or more index pages are older than the ages of the corresponding data pages, the NVM interface can perform a full restore by scanning at least a subset of the remaining data blocks. By scanning at least a subset of the remaining data blocks, the NVM interface can obtain logical-to-physical mappings corresponding to logical addresses of the one or more index pages. The NVM interface can then copy the index pages to a cache of volatile memory (e.g., index table cache 304 of FIG. 3), and update entries of the cache based on the logical-to-physical mappings. Process 700 may then end at step 710.

Accordingly, because context information can be used in conjunction with index pages to reconstruct logical-to-physical mappings, the amount of information that needs to be processed after system reboot can be further reduced. In particular, a full restore may only need to be performed for a small subset of the total number of data blocks. This can improve system efficiency and reduce the amount of time necessary to recover from an unclean shutdown.

It should be understood that processes 400, 500, 600, and 700 of FIGS. 4-7 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method for recovering from a device failure, the method comprising:
   detecting that an unclean shutdown event has occurred;
   scanning a plurality of index pages of a non-volatile memory ("NVM") for ages of the plurality of index pages, said plurality of index pages being stored in said NVM, and wherein the scanning the plurality of index pages potentially avoids scanning every data block of the NVM;
   comparing the ages of the plurality of index pages with ages of data pages of the NVM corresponding to the plurality of index pages;
   determining the reliability of each index page of the plurality of index pages based at least in part on the comparison; and
   selectively using an index page to reconstruct a logical to physical mapping based on the determined reliability of that index page.

2. The method of claim 1, wherein each index page of the plurality of index pages maps at least one logical address to at least one physical address of the data pages.

3. The method of claim 1, wherein comparing further comprises:
   for each index page of the plurality of index pages, determining whether an age of the index page is older than a plurality of ages of corresponding data pages; and
   in response to determining that the age of the index page is not older than the plurality of ages of the corresponding data pages, determining that the index page is reliable.

4. The method of claim 3, wherein in response to determining that the age of the index page is older than the plurality of ages of the corresponding data pages, determining that the index page is unreliable.

5. The method of claim 4, further comprising scanning at least one data block of the NVM having data pages with ages that are younger than the age of the index page.

6. The method of claim 5, further comprising:
   determining that the at least one data block comprises at least one data page that is associated with the index page;
   determining whether the age of the at least one data page is younger than the age of the index page; and
   in response to determining that the age of the at least one data page is younger than the age of the index page, copying the index page to a cache in volatile memory.

7. The method of claim 6, further comprising updating at least one entry of the cache using the at least one data block.

8. The method of claim 7, wherein the updating further comprises reconstructing logical-to-physical mappings corresponding to logical addresses of the index page using the at least one data block.

9. The method of claim 8, wherein the reconstructing further comprises scanning metadata stored in the at least one data block of the NVM.

10. The method of claim 8, wherein the scanning the NVM further comprises reading a block table of contents of the at least one data block.

* * * * *